United States Patent [19]

Dixon

[11] Patent Number: 4,790,427
[45] Date of Patent: * Dec. 13, 1988

[54] APPARATUS FOR HANDLING PALLET-SUPPORTED WORKPIECES

[75] Inventor: Paul H. Dixon, Belvidere, Ill.

[73] Assignee: Dixon Automatic Tool, Inc., Rockford, Ill.

[*] Notice: The portion of the term of this patent subsequent to Dec. 8, 2004 has been disclaimed.

[21] Appl. No.: 87,698

[22] Filed: Aug. 20, 1987

Related U.S. Application Data

[62] Division of Ser. No. 864,417, May 19, 1986, Pat. No. 4,703,843.

[51] Int. Cl.⁴ .............................................. B65G 49/00
[52] U.S. Cl. ............................ 198/803.01; 198/803.7
[58] Field of Search ................. 198/343, 465.1–465.3, 198/803.01, 803.2, 803.7; 29/33 P, 563

[56] References Cited

U.S. PATENT DOCUMENTS

| | | | |
|---|---|---|---|
| 3,370,549 | 2/1968 | Livingston | 198/465.1 |
| 3,722,656 | 3/1973 | Loomis et al. | 198/465.1 |
| 3,789,975 | 2/1974 | Ida et al. | 198/803.7 |
| 3,931,882 | 1/1976 | Ossbahr | 198/803.2 |
| 4,703,843 | 11/1987 | Dixon | 198/345 |
| 4,711,343 | 12/1987 | Dixon | 198/465.2 |

Primary Examiner—Joseph E. Valenza
Attorney, Agent, or Firm—Leydig, Voit & Mayer, Ltd.

[57] ABSTRACT

Workpieces are supported on pallets which are advanced by a continuously driven power-and-free conveyor adapted to permit each pallet to dwell in a work station when the pallet is stopped in the work station during continued driving of the conveyor. To effect the foregoing, the conveyor includes spaced, spring-loaded clamps which normally grip elongated lips on the pallets in order to advance the pallets. When the pallets are stopped, the clamps slip frictionally along the lips so as to allow the pallets to dwell while driving of the conveyor continues.

2 Claims, 2 Drawing Sheets

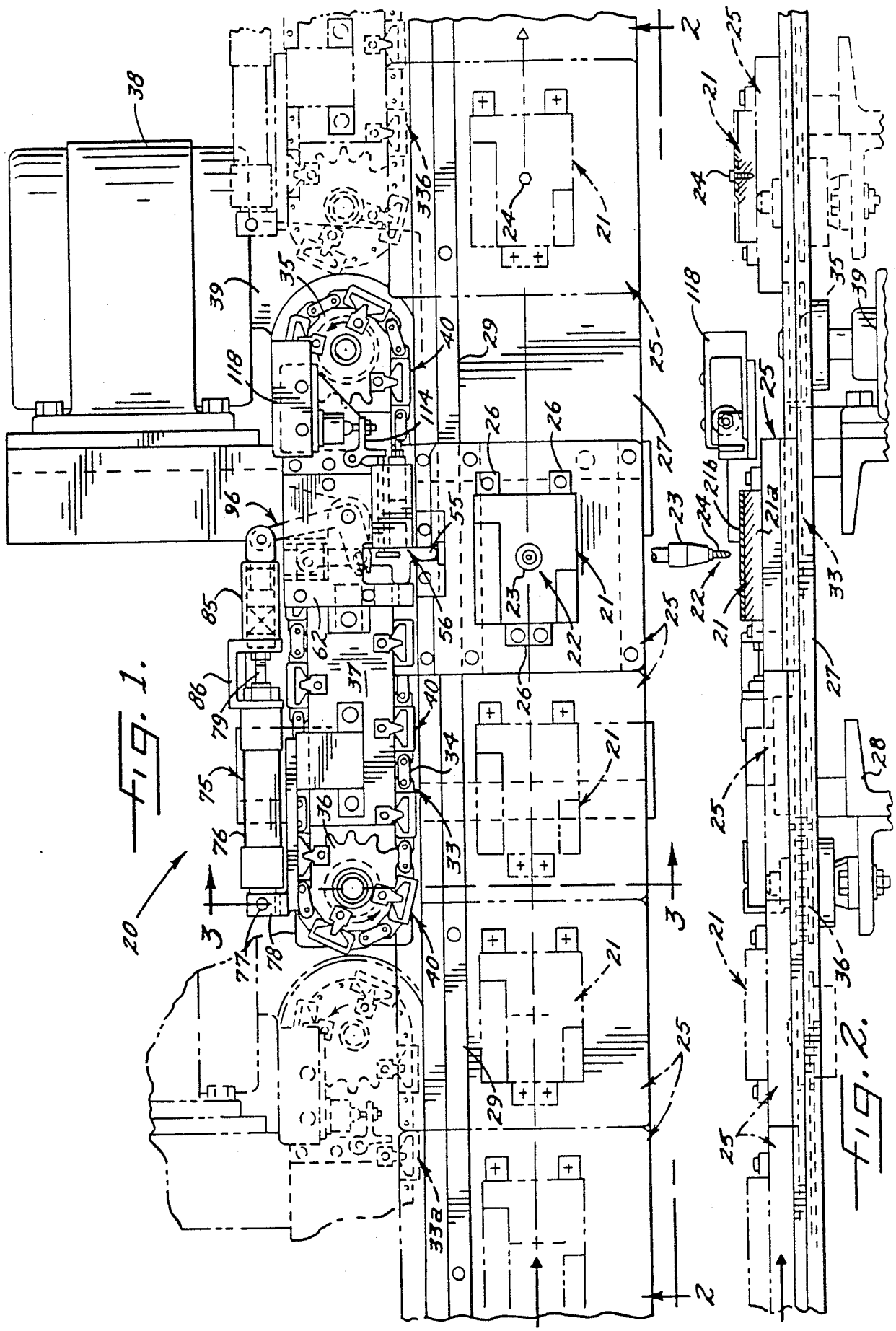

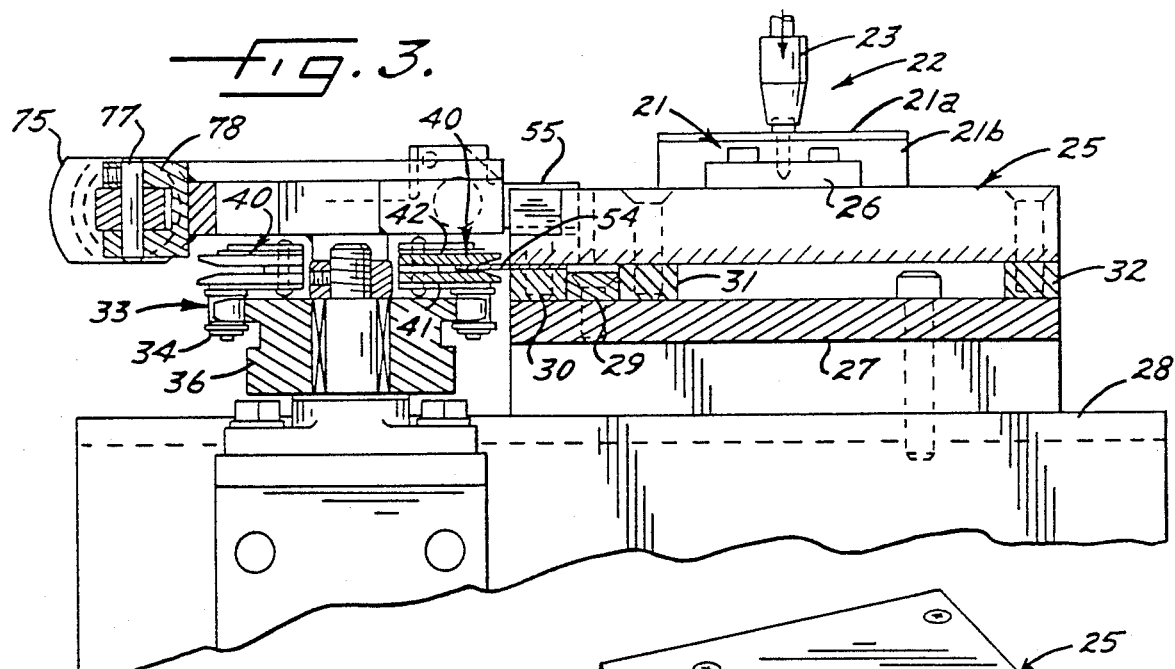
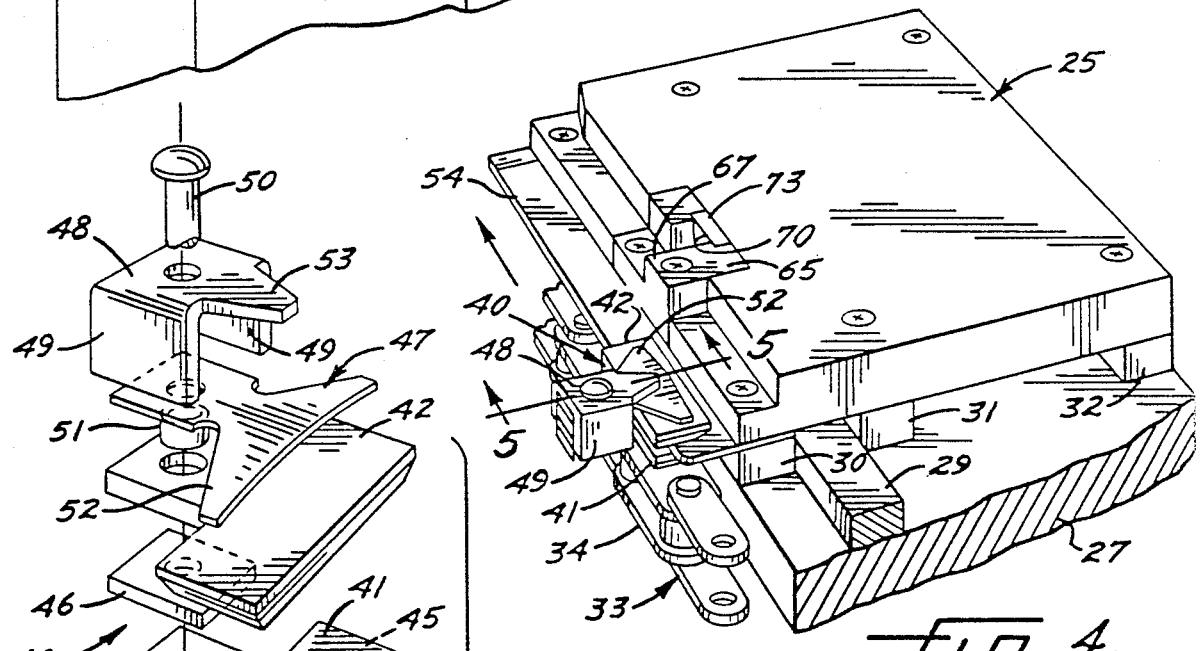
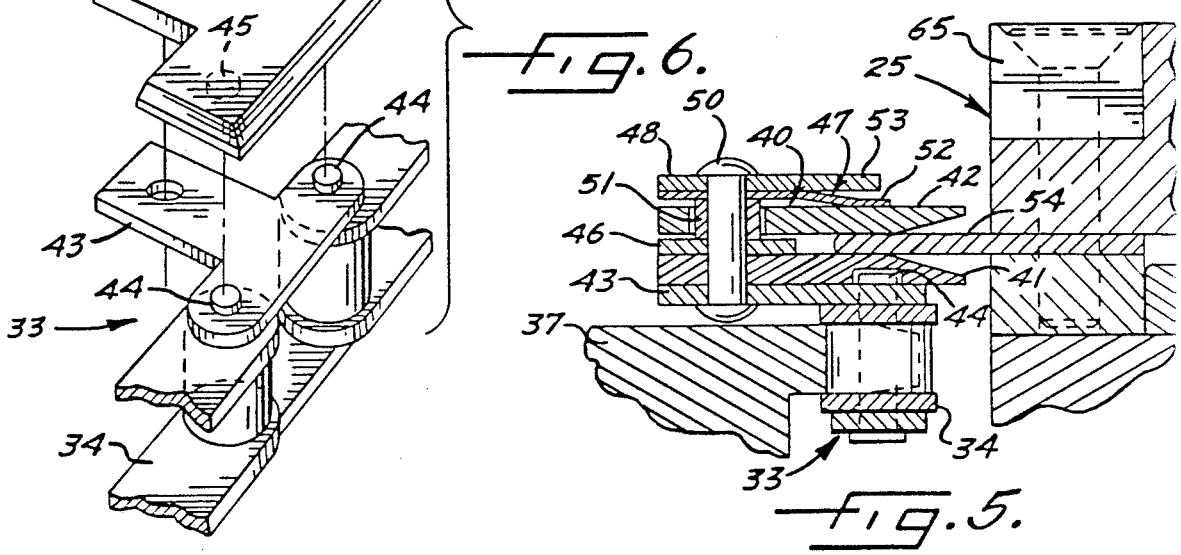

APPARATUS FOR HANDLING PALLET-SUPPORTED WORKPIECES

This is a division of application Ser. No. 864,417 filed May 19, 1986 now U.S. Pat. No. 4,703,843.

BACKGROUND OF THE INVENTION

This invention relates generally to apparatus for handling workpieces and, more particularly, to apparatus for handling workpieces which are supported on pallets adapted to be advanced by a power-and-free conveyor.

A power-and-free conveyor is a continuously driven conveyor which is adapted to advance a row of pallets along a predetermined path. When each pallet of the row is stopped in a work station, the conveyor allows the pallet to dwell in the work station while an operation is performed on the workpiece on the pallet and while driving of the conveyor continues.

SUMMARY OF THE INVENTION

The invention resides in the novel and relatively simple construction of clamps forming part of the power-and-free conveyor and adapted to either advance the pallets or to slip frictionally along the pallets.

Other advantages of the invention will become more apparent from the following detailed description when taken in conjunction with the accompanying drawings.

BRIEF DESCRIPTION OF THE DRAWINGS

FIG. 1 is a top plan view of new and improved workpiece handling apparatus incorporating the unique features of the present invention.

FIG. 2 is a front elevational view as taken along the line 2—2 of FIG. 1.

FIG. 3 is an enlarged fragmentary cross-section taken substantially along the line 3—3 of FIG. 1.

FIG. 4 is a perspective view of a pallet and of a portion of the power-and-free conveyor.

FIG. 5 is an enlarged fragmentary cross-section taken substantially along the line 5—5 of FIG. 4.

FIG. 6 is an exploded perspective view of a portion of the power-and-free conveyor.

DETAILED DESCRIPTION OF THE PREFERRED EMBODIMENT

As shown in the drawings for purposes of illustration, the invention is embodied in apparatus 20 for handling workpieces 21 and specifically in apparatus for advancing a series of workpieces along a predetermined path through a work station 22 where an operation is performed on the workpieces. In this specific instance, each workpiece has been shown as consisting of a lower block 21a (FIG. 2) and an upper plate 21b. At the work station 22, a power-operated screwdriver 23 of the type shown in Dixon U.S. Pat. No. 3,675,302 acts to drive a screw 24 through the plate 21b and into the block 21a and thereby fasten the two together to form a unitary assembly 21. It will be appreciated that many other workpieces different from those specifically shown may be handled by the apparatus and that many varied operations may be performed at the work station 22.

Herein, the workpieces 21 are carried by and are fixtured on a row of end-to-end pallets 25 which support the workpieces as the latter are advanced through the work station 22. Each pallet comprises a generally flat plate whose upper side carries suitable fixturing clamps 26 (FIGS. 1 and 3) for holding the workpiece rigidly in a predetermined position on the pallet. To support the pallets to advance through the work station 22, a fixed track 27 (FIGS. 1, 3 and 4) mounted on a stationary frame 28 underlies the pallets and extends through the work station 22 along the path of advance of the row of pallets. To guide the pallets along such path, guide means in the form of an elongated rail 29 (FIG. 4) is fixed to and extends along the upper side of the track and fits slidably between two transversely spaced guide means or rails 30 and 31 rigid with and depending from the underside of each pallet 25. A third rail 32 on the underside of each pallet 25 is spaced transversely from the rails 30 and 31 and coacts with the latter to hold the underside of the pallet in vertically spaced relation with the upper side of the track 27.

Advance of the pallets 25 through the work station 22 is effected by a power-and-free conveyor 33 (FIG. 1) which is located alongside the track 27. The conveyor comprises a roller chain 34 trained around driving and driven sprockets 35 and 36 rotatably supported by the frame 28 and spaced from one another along the track 27. Between the sprockets, the chain 34 is guided by a plate 37 (FIGS. 7 and 11) which is secured rigidly to the frame. A drive motor 38 (FIG. 1) with a speed reducer 39 is attached to the frame and is operably connected to the driving sprocket 35 to rotate that sprocket in a counterclockwise direction and cause the pallets to advance from left-to-right as viewed in FIG. 1.

Advantageously, the conveyor 33 includes unique clamps 40 which normally grip the pallets 25 to advance the pallets along the track 27 and through the work station 22 but which automatically slip frictionally along each pallet when the latter is stopped and thereby allow the pallet to dwell in the work station while driving of the chain 34 continues. The clamps are spaced from one another along the chain 34 and as shown most clearly in FIGS. 5 and 6, each clamp includes a pair of lower and upper jaws 41 and 42 which are adapted to move toward and away from one another to either grip the pallets tightly or to slip frictionally along the pallets. The lower jaw 41 of each clamp 40 is a generally T-shaped plate and overlies a T-shaped connecting link 43 (FIG. 6) which is secured between two adjacent links of the chain 34 by vertical pins 44. Those pins dowel into recesses 45 in the lower side of the jaw 41 and prevent the jaw from shifting edgewise relative to the connecting link 43.

The upper jaw 42 of each clamp 40 is shaped generally the same as the lower jaw 41 and is spaced vertically from the latter by a thin block 46 (FIG. 6) which is sandwiched between the tongue portions of the two T-shaped jaws. A generally T-shaped leaf spring 47 overlies the upper jaw 42 and is held in place by a clamp 48 which prevents the spring and the upper jaw 42 from shifting edgewise relative to the lower jaw 41. As shown in FIG. 6, the clamp 48 is of inverted U-shaped configuration and is formed with a pair of depending ears 49 which straddle the tongue portions of the spring 47, the jaws 42 and 41 and the connecting link 43. A rivet 50 extends through holes in such tongue portions and also through a hole in the spacer block 46. Encircling the rivet and sandwiched between the spacer block 46 and the spring 47 is a spacer bushing 51 which is disposed in the hole in the tongue portion of the upper jaw 42 and which holds the tongue portion of the spring 47 against the lower side of the clamp 48 and in upwardly spaced relation from the tongue portion of the upper jaw.

As shown most clearly in FIG. 5, the leaf spring 47 includes an elongated portion 52 bent downwardly from the tongue portion of the spring and biased downwardly against the upper jaw 42. The spacer block 46 serves as a fulcrum for the upper jaw 42 while the spacer bushing 51 allows limited pivoting of the upper jaw on the rivet 50 and toward and away from the lower jaw 41. As a result, the upper jaw is pressed downwardly toward the lower jaw by the spring 47 but is permitted to pivot upwardly relative to the lower jaw. The spacer block 46 prevents the upper jaw 42 from completely closing against the lower jaw 41 while a lug 53 (FIG. 6) on the clamp 48 overlies the elongated portion 52 of the spring 47 to limit upward pivoting of the upper jaw and prevent overstressing of the spring.

The jaws 41 and 42 of the clamps 40 are adapted to frictionally grip elongated lips 54 (FIGS. 4 and 5) carried by the pallets 25 adjacent the guide rails 30 thereof, each lip extending along the entire length of the pallet and overlying the conveyor chain 34. The jaws of the clamps straddle the lip of each pallet and, as long as the pallet is free to move along the track 27, the springs 47 of the clamps press the jaws into tight engagement with the lip to cause the jaws to advance the pallet. If a given pallet is stopped, however, the springs yield to enable the upper jaws 42 of the clamps to pivot upwardly from the lower jaws 41 and thereby permit the clamps simply to slip frictionally along the lips 54 without advancing the pallet. The leading edges of the jaws 41 and 42 are beveled inwardly as shown in FIG. 6 so that the trailing end of the lip 54 of a stopped pallet may cam the jaws apart and thereby permit the jaws to straddle the lip.

With the foregoing arrangement, the clamps 40 of the continuously driven conveyor 33 advance successive pallets 25 into the work station 22 and then slip frictionally on each pallet when such pallet is stopped in the work station. Trailing pallets are stopped by the pallet in the work station and thus the clamps also slip with respect to those pallets. After the screw 24 has been driven into the workpiece 21 on the pallet stopped in the work station 22, that pallet is released from a stopped condition in the work station and, at such time, the clamps again tightly grip the pallets to advance the completed pallet out of the work station and to advance the next pallet into the work station. Conveyors 33a and 33b (FIG. 1) identical to the conveyor 33 may be located upstream and downstream, respectively, of the conveyor 33, the conveyor 33a serving to feed pallets to the conveyor 33 while the conveyor 33b takes control of and advances the pallets as the pallets move past the downstream sprocket 35 of the conveyor 33. The track 27 may be of an oval or race track configuration and various conveyors similar to the conveyor 33 may be spaced around the entire track to keep a continuous flow of intermittently stopped pallets circulating around the track.

I claim:

1. Apparatus for handling workpieces and comprising a row of pallets each adapted to hold a workpiece, continuously driven power-and-free conveyor means for advancing said pallets along a predetermined path, each of said pallets including a lip extending along said path and projecting toward said conveyor means, said conveyor means comprising a series of spaced clamp means for normally gripping the lips of said pallets tightly to advance said pallets along said path, said clamp means slipping frictionally along the lip of each pallet when the pallet is stopped along said path and as driving of said conveyor continues.

2. Apparatus as defined in claim 1 in which each of said clamp means comprises a pair of opposing jaws with at least one of said jaws being movable toward and away from the other jaw, and means for resiliently biasing said one jaw of each clamp toward the other jaw thereof.

* * * * *